Aug. 23, 1966     J. F. DILLON, JR     3,267,804
OPTICAL CIRCULATOR
Filed Jan. 3, 1963
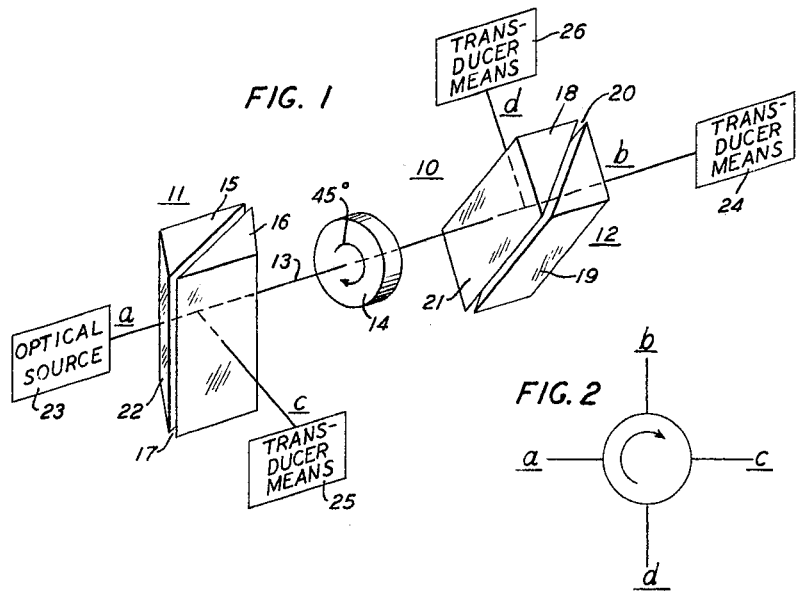
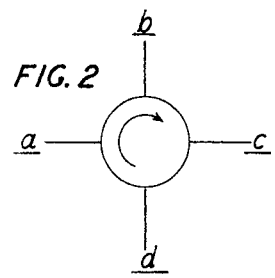
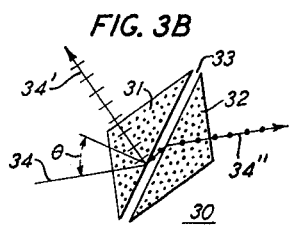
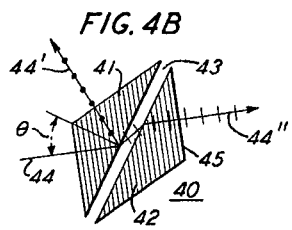
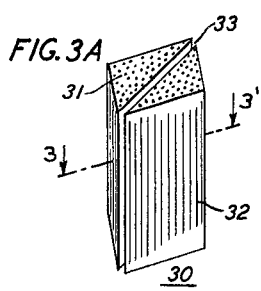
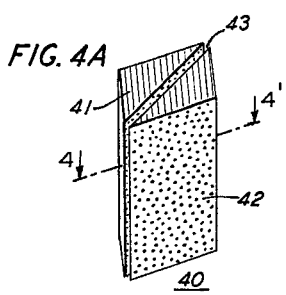
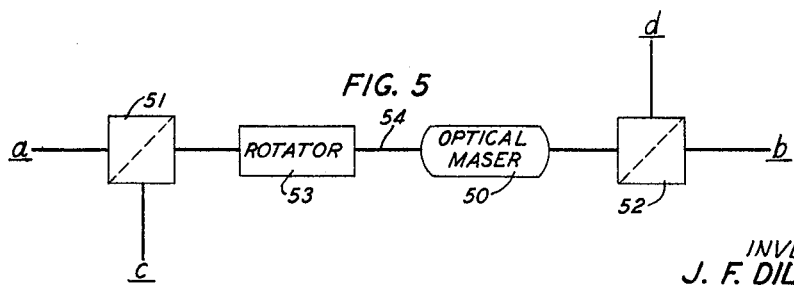
INVENTOR
J. F. DILLON, JR.
BY Kenneth W Mateer
ATTORNEY United States Patent Office 3,267,804
Patented August 23, 1966

3,267,804
OPTICAL CIRCULATOR
Joseph F. Dillon, Jr., Morris Township, Morris County, N.J., assignor to Bell Telephone Laboratories, Incorporated, New York, N.Y., a corporation of New York
Filed Jan. 3, 1963, Ser. No. 249,173
3 Claims. (Cl. 88—61)

This invention relates to optical frequency electromagnetic wave energy transmission apparatus and, more particularly, to optical circulators.

The concept of nonreciprocal interconnections among a plurality of wave energy paths is priorly disclosed for example in an article entitled "The Behavior and Applications of Ferrites in the Microwave Region" by A. G. Fox, S. E. Miller and M. T. Weiss, which appeared at pages 5–103 of the Bell System Technical Journal, January, 1955. The devices there described were limited to operation at microwave frequencies in conductively bounded wave guides. The advent of optical masers capable of providing coherent substantially monochromatic wave energy sources has since opened up new horizons for the communications industry. Thus for example, modulated optical frequency energy beams offer extremely broad band communication channels for use in a light communication system. However, many of the components heretofore available at the lower prior art frequencies are not adaptable to such higher frequency systems, in which the propagation characteristics are governed by optical rather than microwave considerations. One such component is the circulator in which energy applied at a first port appears at a second port but energy applied at the second port appears, not at the first port, but a third port.

It is therefore an object of the present invention to extend circulator principles into the optical frequency range.

It is a more specific object of the invention to interconnect nonreciprocally a plurality of optical wave energy ports with components which operate in accordance with the laws of optics.

Circulators in accordance with the invention comprise first and second polarizing prisms, which transmit incident light in directions determined by the polarization of the light, spaced apart along the transmission path of light therebetween, a polarization rotator disposed on said path between the polarizers, means for illuminating at least one external surface of one of said prisms with linearly polarized light, and means for receiving transmitted light at each of at least three of the external prism surfaces. The first and second polarizing prisms are each characterized by single optic axis directions which lie in parallel planes and comprise a pair of prisms separated by a gap. The polarizing prisms are rotated to impart a 45° relative angular relationship between these optic axis directions. With the prisms thus oriented, a four port circulator results in which optical energy of the proper polarization incident upon a first external prism surface, or port, propagates to a second prism surface or port; energy incident at said second port propagates to a third prism surface or port; energy incident at said third port propagates to a fourth prism surface, or port; and energy incident at said fourth port propagates to said first port. Thus the device is nonreciprocal in nature. By introducing reflection at one of the four ports, the device can be reduced to a three port circulator.

In typical prior usage, polarizing prisms were used in apparatus in which an unpolarized light beam was applied at one surface and the plane polarized beam emergent from a second surface was utilized for some further optical purpose. The energy which was reflected from the gap was generally unwanted and was typically absorbed in black paint on the prism surface through which the ray would normally pass. In the present invention, the polarizing prisms are used in a new combination of elements to produce optical circulator action. Instead of applying unpolarized light, light having a polarization either parallel to or normal to the optic axis of one of a pair of spatially rotated prisms is applied, all output surfaces are free from highly lossy absorptive coatings, and optical rotation means are interposed between the rotated prisms.

The above and other objects of the invention, together with its various features and advantages, will be more readily apparent from reference to the accompanying drawing and the detailed description thereof which follows.

In the drawing:

FIG. 1 is a perspective view of an optical circulator in accordance with the invention;

FIG. 2, given for purposes of explanation, is a diagrammatic representation of the coupling characteristics of the circulator of FIG. 1;

FIGS. 3A and 3B are perspective and cross sectional views respectively of a first polarizing prism appropriate for use in an optical circulator;

FIGS. 4A and 4B are perspective and cross sectional views respectively of a second polarizing prism appropriate for use in an optical circulator; and FIG. 5 is a block diagram of a typical multiple channel amplifier for an optical communication system.

The concept of a multiport wave energy circulator is known in the microwave art, the accepted symbology for such an element being shown in FIG. 2. In FIG. 2, waves applied at port $a$ are transmitted in circular fashion to port $b$, application at $b$ leads to $c$, application at $c$, to $d$, and application at $d$, to $a$. Thus, each port is coupled around the circle to only one other port for a given port of application. Accordingly when energy is applied to any given port of exit, the energy is coupled to a different port from that which would produce a signal at the excited port.

Referring now to FIG. 1 in detail, there is shown an optical circulator 10 comprising polarizing prisms 11, 12 spaced apart along propagation axis 13 on which rotator 14 is interposed. Polarizing prism 11 comprises a pair of prisms 15, 16 of triangular cross section positioned with their broad faces adjacent and separated by gap 17 which is filled with a dielectric material such as air, for example. Polarizing prism 12 comprises a pair of prisms 18, 19 of triangular cross section positioned with broad faces adjacent and separated by gap 20, also filled with a dielectric material, such as air. Prisms 11, 12 are oriented relative to each other such that the end faces intersected by axis 13 are mutually parallel and such that the intersection of the end face 21 of prism 12 and the plane of gap 20 is oriented at 45° relative to the intersection of end face 22 of prism 11 and the plane of gap 17. Prisms 15, 16, and 18, 19 comprise birefringent material to be more specifically described hereinafter.

Rotator 14 is disposed along the transmission axis 13 between polarizers 11, 12 and comprises an optically active material capable of imparting Faraday rotation of the plane of polarization to incident linearly polarized optical frequency wave energy. The amount of rotation introduced by rotator 14 is typically controlled by the magnitude and/or orientation of a steady magnetic field applied to the material by appropriate control means not here shown. As a particularly appropriate example, rotator 14 can comprise chromium tribromide, the optical rotation properties of which are disclosed in my copending application Serial Number 206,102, filed June 28, 1962, and assigned to the assignee of this application.

A more complete understanding of the nature and characteristics of polarizing prisms which can be employed, as prisms 11, 12, in optical circulators in accordance with the present invention can be obtained from a consideration of FIGS. 3A, 3B and FIGS. 4A, 4B.

In FIG. 3A there is illustrated a polarizing prism 30 of the Glan-Foucault class comprising for example two calcite (CaCO$_3$) prisms 31, 32 separated by gap 33 which can comprise air. Calcite is a material which is birefringent, in that the index of refraction presented to incident light waves depends upon the plane of polarization of the waves. Unpolarized energy incident upon such material is split into two component portions, one of which follows Snell's law and is termed the ordinary ray, the other of which does not follow Snell's law and is termed the extraordinary ray. Calcite is further defined as a uniaxial material since there is a certain specific direction associated with it which is termed the optic axis. This direction is distinguished from all other directions by the fact that when a beam of light traverses the crystal along the optic axis, the two rays, ordinary and extraordinary, proceed with equal velocity along the same path and are not distinct. A beam of light traversing the crystal in any direction other than parallel to the optic axis direction is characterized by two rays propagating with unequal velocities. In FIG. 3A the optic axis direction is indicated to be parallel to the plane of the air gap, and is illustrated by the lines and dots. FIG. 3B, which is a cross sectional view of prism 30 in FIG. 3A taken along line 3—3', illustrates the polarization selective nature of polarizing prism 30. In FIG. 3B ray 34 of unpolarized light is incident upon triangular prism 31 at 90°. Since ray 34 is normal to the optic axis direction of the calcite, the ordinary and extraordinary rays propagate along the same path in prism 31 but with different velocities. Ray 34 is incident upon gap 33 at an angle $\theta$, the magnitude of which is of critical importance. Since the ordinary and the extraordinary ray components of ray 34 are traveling with unequal velocities, the index of refraction associated with the material comprising prism 31, defined as $n=c/v$ where $c$ is the velocity of light in vacuum and $v$ its velocity in the material, is different for the two ray components. From a consideration of Snell's law, for waves traveling from an optically denser medium ($n_1$) into an optically rarer one ($n_2$), refraction cannot take place for all angles of incidence. Specifically, if $\sin \theta > n_2/n_1$, the angle of refraction is imaginary and the wave is totally reflected from the boundary. In the case of birefringent materials, therefore, there is a range of angles of incidence $\theta$ for ray 34 for which one of the ray components will be reflected and one will be refracted. Since the ray components are orthogonally polarized, the effect of passing an unpolarized light beam through the prism at an angle of incidence at gap 33 within the proper range is to split the beam into a transmitted component polarized parallel to the optic axis and a reflected component normal to it.

Specifically, with respect to the calcite prism of FIG. 3B, $n_2$ is unity since gap 33 is air filled and $n_1$ is, for sodium light in calcite either $n_o=1.6584$ or $n_e=1.4864$ depending upon whether the ordinary or extraordinary ray is considered. From Snell's law, if $\theta$ is greater than 37°, the ordinary ray will be totally reflected at gap 33 as ray 34', which is polarized normal to the optic axis of prism 31. If the angle of incidence $\theta$ is greater than 42°, the extraordinary ray will be likewise reflected from the gap. If, however, $\theta$ is between 37° and 42°, the ordinary ray will be reflected, while the extraordinary ray will be refracted at gap 33 and will be transmitted through prism 32 as ray 34" which is polarized parallel to the optic axis of prisms 31, 32. In order to reduce reflection of the reflected and refracted rays from the boundaries between the prism medium and its external surrounding medium, these surfaces are made normal to the direction of travel of the ray.

FIGS. 4A and 4B are perspective and cross sectional views of a polarizing prism of the Taylor modified Glan-Foucault class which can also be used as the polarizing prism of an optical circulator in accordance with the invention. In FIG. 4A prism 40 comprises a pair of triangular prisms 41, 42 which are separated by gap 43. The prism of FIG. 4A comprises a birefringent material such as calcite and differs from that of FIG. 3A only in the relative orientation of the optic axis direction. Thus, whereas the optic axis direction of prism 30 is parallel to the intersection of the plane of the air gap and the plane of the prism face at which the beam enters, the optic axis direction of prism 40 is perpendicular to the intersection of the plane of the air gap and the plane of the prism face at which the beam enters. FIG. 4B, a cross sectional view of FIG. 4A taken at line 4—4', illustrates the polarization selective nature of prism 40. A beam 44 of unpolarized light incident upon an external prism face at a right angle splits into two components, one the extraordinary ray with a polarization parallel to the optic axis, the other the ordinary ray with a polarization normal to the optic axis and normal to that of the extraordinary ray. These rays, as in prism 30 of FIG. 3, propagate in prism 41 along the same path with unequal velocities. Upon incidence at gap 43 at an angle $\theta$, the same total reflection condition exists as for prism 30. Thus, if $37° < \theta < 42°$, the ordinary ray will be totally reflected from the boundary between prism 41 and gap 43 as ray 44' while the extraordinary ray will be refracted at the gap and transmitted through prism 42 as ray 44", emerging at surface 45 parallel to input ray 44 when surface 45 is parallel to the input surface. Again, to reduce reflection at the external boundary, the external surface through which ray 44' emerges is made normal to the direction of ray travel.

The Taylor modified Glan-Foucault polarizing prism shown and described in FIGS. 4A, 4B is characterized by a reflection coefficient for the extraordinary ray at the air gap which is lower than that of the Glan-Foucault prism. Briefly, the lower level of reflection is due to the parallelism between the electric vector of the extraordinary ray and the plane of incidence of the ray upon the gap. In the Glan-Foucault prism, the electric vector of the extraordinary ray and the plane of incidence are perpendicular. Thus, for applications of the invention in which low reflection losses are especially desired, the prism of FIGS. 4A, 4B is more attractive.

Returning now to FIG. 1, and to its operation as an optical circulator, linearly polarized wave energy is applied from optical source 23 to end face 22 of polarizing prism 11, which forms port $a$ of the circulator. The energy is polarized parallel to the optic axis of prism 11. Thus if prism 11 is a Glan-Foucault prism as described with reference to FIGS. 3A, 3B, the polarization is parallel to the intersection of the plane of gap 17 and face 22. If prism 11 is a Taylor modified Glan-Foucault prism, the polarization is perpendicular to the intersection of the plane of gap 17 and face 22. Since these polarizations correspond to the extraordinary ray orientation within prism 11, and since the prisms are proportioned such that the incident ray impinges upon gap 17 at an angle within the range for which the extraordinary ray is transmitted, the incident ray passes through prism 11 and propagates along axis 13 toward rotator 14. Upon incidence on and transmission through rotator 14, the plane of polarization of the beam is rotated 45° in a clockwise sense viewed from prism 11. When rotator 14 comprises chromium tribromide, for example, the amount of rotation introduced thereby can be controlled by the magnitude of the component of the magnetization of the material parallel to axis 13. In such an arrangement it is necessary that the temperature of the rotating medium be held below its Curie point of approximately 36° K.

If rotator 14 comprises a paramagnetic glass, such as lead oxide glass, the amount of rotation is proportional to the component of the magnetic field applied along axis 13.

The beam, after the 45° rotation has been introduced, propagates to polarizing prism 12, which is physically identical to prism 11, but which is rotated 45° also in a clockwise sense about axis 13 as viewed from prism 11. Thus, for energy transmitted through prism 11 and rotator 14, prism 12 appears identical to prism 11 and the beam, which corresponds to the extraordinary ray, is transmitted through prism 12 and exits at port b, propagating to transducer means 24. If now an optical beam having a polarization parallel to the optic axis of prism 12 is applied at port b, it will propagate through prism 12, be rotated 45°, again in a clockwise sense when viewed from prism 11, and will propagate toward prism 11 along axis 13. The beam polarization is now related to the optic axis of prism 11 by 90°, having been introduced at port b with a 45° rotation and rotated by rotator 14 an additional 45°. Thus related, the beam corresponds to an ordinary ray within the prism. When therefore the beam reaches gap 17, a total reflection occurs, the beam appearing at port c for utilization by transducer means 25. Similarly a beam introduced at port c with a polarization normal to the optic axis of prism 11 is totally reflected at gap 17 to propagate along axis 13, is rotated 45° by rotator 14 and is incident on prism 12 with an orientation corresponding to the ordinary ray therein. Consequently, the ray is totally reflected at gap 20 and emerges at port d for utilization by transducer 26. A beam entering at port d with a polarization normal to the optic axis of prism 12 is reflected at gap 20 to propagate along axis 13, is rotated 45° by rotator 14 and enters prism 11 with a polarization parallel to the optic axis thereof. Thus the beam, now in extraordinary ray orientation, is transmitted through gap 17 and emerges at port a for utilization. It can thus be seen that the four ports a, b, c, d are interconnected nonreciprocally in circulator fashion.

The description above has referred specifically to the four port circulator of FIG. 1. Such a four port arrangement can be converted to a three port circular by introducing a total reflection at one of the external ports. Thus for example if the prism face associated with port c is silvered, the coupling among terminals becomes a→b, b→d, d→a.

One of the many possible applications of the optical circulator arrangement of FIG. 1 is indicated in FIG. 5 in which a four port circulator-amplifier comprising polarizing prisms 51, 52 and rotator 53 is illustrated in block form. Optical maser 50 is interposed on beam axis 54 between rotator 53 and polarizer 52, although it could be equally appropriately positioned between polarizer 51 and rotator 53. The optical maser 50 can be either solid state or gaseous as described in an article entitled "Optical Masers" by A. L. Schawlow which appeared in Scientific American, volume 204, June 1961, depending upon the power and amplification levels of interest.

In operation, ports a, b, c and d are nonreciprocally interconnected in accordance with the circulator properties of the arrangement, and energy passing between any one of the pairs a→b, b→c, c→d, or d→a, will be amplified on passage through the maser. In such an arrangement a single optical maser can be used to amplify signals which are simultaneously being transmitted between pairs of ports.

In all cases, it is understood that the above-described arrangements are merely illustrative of the many specific embodiments which can represent an application of the principles of the invention. Numerous and varied other arrangements can be readily devised in accordance with these principles by those skilled in the art without departing from the spirit and scope of the invention.

What is claimed is:
1. An optical circulator having at least three ports comprising
   first birefringent means for transmitting incident electromagnetic wave energy of orthogonal polarizations through different surfaces thereof,
   said first birefringent means comprising first and second prisms of given refractive index which are separated by a gap of refractive index less than said given index and which have optic axis directions which are parallel,
   second birefringent means for transmitting incident electromagnetic wave energy of orthogonal polarizations through different surfaces thereof spaced away from said first means along the path of energy transmitted therebetween,
   said second birefringent means comprising third and fourth prisms of given refractive index which are separated by a gap of refractive index less than said given index and which have optic axis directions which are parallel,
   all external surfaces of said prisms through which said energy propagates being oriented normal to the propagation direction therethrough,
   the optic axis direction of said first and second prisms and the optic axis direction of said third and fourth prisms being related by a 45 degree angle in a given rotational sense,
   means for illuminating a first surface of one of said prisms with plane polarized electromagnetic wave energy having a polarization plane containing the optic axis of the illuminated means,
   the illuminated surface of said prism defining the first port of said circulator,
   means disposed on said path for rotating the plane of polarization of said wave energy into a plane which is related to the input polarization by 45 degrees in said given rotational sense,
   and low loss means for receiving wave energy disposed at the remainder of the external surfaces of said prisms through which energy can propagate, said remainder of surfaces comprising the remainder of ports of said circulator.

2. An optical circulator having at least three ports comprising
   first birefringent means for transmitting incident light in directions determined by the polarization thereof,
   said first birefringent means comprising first and second prisms of given refractive index which are separated by an air gap of refractive index less than said given index and which have optic axis directions which are parallel,
   second birefringent means for transmitting incident light in directions determined by the polarization thereof spaced away from said first means along the path of light transmitted therebetween,
   said second birefringent means comprising third and fourth prisms of given refractive index which are separated by an air gap of refractive index less than said given index and which have optic axis directions which are parallel,
   the optic axis direction of said first and second prisms and the optic axis direction of said third and fourth prisms being related by a 45 degree angle in a given rotational sense,
   means for illuminating one of said birefringent means with polarized light having a polarization plane containing the optic axis of the illuminated means,
   the illuminated surface of said illuminated means defining the first port of said circulator,
   means for rotating the plane of polarization of light emerging from said first means along said path 45 degrees in said given rotational sense,
   and low loss means for receiving light emergent from the remainder of the external surfaces of said prisms, said remainder of prism surfaces being normal to the axis of propagation of the exiting light and comprising the remaining ports of said circulator.

3. An optical circulator having at least three ports comprising
a first polarizer for transmitting incident light waves along different directions depending upon the polarization of said light waves,
said first polarizer comprising first and second prisms of given refractive index which are separated by an air gap of refractive index less than said given index and which have optic axis directions which are parallel,
a second polarizer for transmitting incident light waves along different directions depending upon the polarization of said light waves,
said second polarizer being spaced away from said first polarizer along the path of light transmitted therebetween,
said second polarizer comprising third and fourth prisms of given refractive index which are separated by an air gap of refractive index less than said given index and which have optic axis directions which are parallel,
the optic axis direction of said first and second prisms and the optic axis direction of said third and fourth prisms being in parallel planes and being related by a 45 degree angle in a given rotational sense,
means for illuminating one surface of one of said prisms with linearly polarized light having a polarization plane related to the optic axis of the illuminated prism by $n \pi/2$ where $n =, 1, 2 \ldots$,
the illuminated surface of said prism defining a first port of said circulator,
means for introducing a 45 degree rotation of the plane of polarization of said light in said given rotational sense, said means comprising a Faraday rotation device interposed between said first and said second polarizers along said light path,
and low loss means for receiving light waves disposed at the remainder of the external surfaces of said prisms, said surfaces comprising the remainder of the ports of said circulator.

References Cited by the Examiner

UNITED STATES PATENTS 2,106,752  2/1938  Land _____ 88—65
2,887,664  5/1959  Hogan _____ 333—24.3

OTHER REFERENCES

Meyer, "The Solid-State Maser," Electronics, April 25, 1958, page 70 relied on.

JEWELL H. PEDERSEN, *Primary Examiner.*

J. L. CHASKIN, R. L. WIBERT, *Assistant Examiners.*